Nov. 3, 1970

C. W. JOHNSON 3,537,663

PAPER UNWIND STAND EQUIPPED FOR FLYING SPLICE

Filed Jan. 17, 1969

INVENTOR.
CARL W. JOHNSON
BY
Wolfe, Hubbard, Voit & Osann
ATTORNEYS.

United States Patent Office 3,537,663
Patented Nov. 3, 1970

3,537,663
PAPER UNWIND STAND EQUIPPED FOR FLYING SPLICE
Carl W. Johnson, Neenah, Wis., assignor to Kimberly-Clark Corporation, Neenah, Wis., a corporation of Delaware
Filed Jan. 17, 1969, Ser. No. 791,932
Int. Cl. B65h 19/18
U.S. Cl. 242—58.1          10 Claims

ABSTRACT OF THE DISCLOSURE

A method and apparatus for continuously supplying strip material, such as paper tape, under substantially constant tension to a helical tube winder or the like is disclosed. The unwind stand includes a pair of circular turntable assemblies each rotatably mounted on a base for supporting a roll of the strip material with a mechanical strip tension feedback and frictional drag element biased against each of the turntables to maintain substantially constant tension on the strip material drawn from the supply rolls. The strip material is initially guided from the respective supply rolls over elements defining closely spaced parallel paths and then over additional elements which define a variable length discharge loop normally biased to maintain a substantial length to the loop. Before the supply of strip material from the first roll is exhausted, the strip material traveling along the path to the discharge loop is severed and held while the leading end of the strip material from the other supply roll is spliced to the trailing end of the severed strip material. As this takes place the strip tension overcomes the biasing force imposed on the long discharge loop permitting it to shorten as the strip material is drawn from the loop prior to release of the splice.

BACKGROUND OF THE INVENTION

The present invention relates to methods and apparatus for supplying strip material and more particularly concerns a method and apparatus for continuously supplying thin strip material from successive supply rolls without interruption.

In copending application Ser. No. 726,522, filed May 3, 1968, and entitled "Laminated Tube Structure and Method and Apparatus for Manufacturing Same" and in which I am one of the joint applicants, there is disclosed a method and apparatus for making a three-ply laminated tube structure particularly suited for use in the fabrication of tampon applicator devices or the like. The tube structure includes a glazed tissue inner ply having a relatively high fold endurance, a thin outer ply made of high quality, high strength paper having an extremely smooth coating on the exterior surface, and a relatively thick intermediate ply of short-fibered, porous, blotter-type paper having negligible fold endurance and interposed between and bonded to the inner and outer plies by a brittle, water soluble adhesive. As there disclosed, the three strips of paper are supplied from separate supply roll unwind stands; under constant, low tension, to the fixed mandrel of a helical tube winding apparatus. A mechanical feedback arrangement on each of the unwind stands senses strip tension and by applying a corrective drag force regulates the tension.

The method and apparatus for supplying three strips of material to a helical tube winding apparatus as disclosed in the above-mentioned application has been quite satisfactory for fabricating three-ply tubes on an intermittent production basis. However, due to the different thicknesses and other characteristics of the three plies of strip material, the respective supply rolls are used up at different rates. When one of the supply rolls is exhausted, of course, the tube winding apparatus must be stopped while the exhausted roll is replaced. The other two supply rolls must also be simultaneously replaced, leaving a substantial amount of strip material on these rolls; or the tube winding apparatus must be again stopped when each of these rolls is exhausted. The result is either a substantial amount of wastage of strip material or a substantial amount of down time for the tube winding apparatus.

SUMMARY OF THE INVENTION

The primary aim of the present invention is to provide a method and apparatus for continuously supplying thin strip material under substantially constant, low tension from successive supply rolls without interruption.

It is a more specific object to provide a method and apparatus for continuously supplying strip material which permits splicing the leading end of the strip material from a second supply roll to the trailing end of the material from the first supply roll without interrupting the supply of strip material to a tube winding apparatus or the like.

A more detailed object of the invention is to provide a method and apparatus for continuously supplying strip material from successive supply rolls which entails initially guiding the strip material from the respective supply rolls over independent guide means which together with a common guide define parallel paths leading to a variable length discharge loop which loop diminishes in length as the strip material from the second roll is spliced to the material for the first roll and released before the length of the loop is entirely diminished.

Other objects and advantages of the invention will become more readily apparent upon reading the following detailed description and upon reference to the drawings in which.

Figure 3:
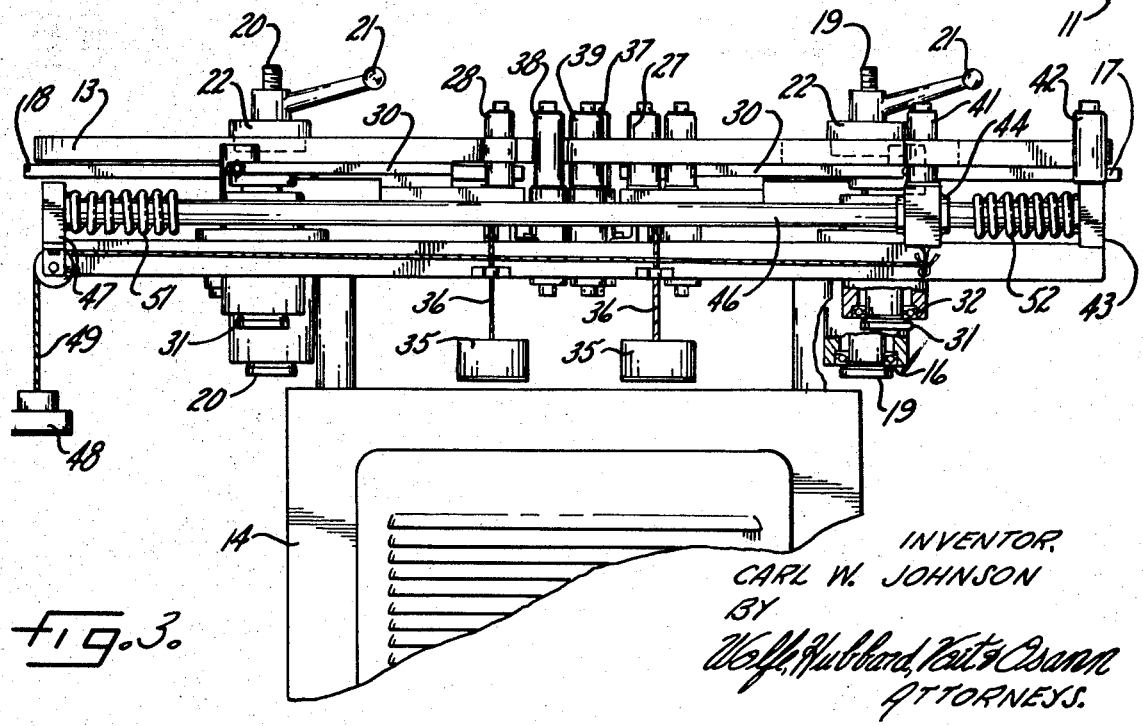
FIG. 3 is a fragmentary front elevation of the unwind stand shown in FIG. 1.

Turning now to the drawings there is shown an unwind stand 10 for continuously supplying strip material, such as thin paper tape 11 from successive supply rolls 12 and 13 without interruption. The unwind stand includes an enclosed frame 14 which supports a base plate 15 journalling in suitable bearings 16 (only one of which is shown) a pair of rotatable turntables 17 and 18 mounted on shafts 19 and 20, respectively (see FIG. 3). Each shaft 19, 20 is threaded at its upper end to receive a threaded handle 21 which bears against a washer 22 to firmly hold the supply rolls 12 and 13 on the respective turntables 17 and 18. The mass of each of the turntables 17, 18 is relatively high compared to that of the supply rolls 12, 13 and, once brought up to speed, the turntables and their supply rolls rotate quite smoothly irrespective of the decreasing mass of the supply roll and the decreasing effective lever arm of the strip material on the supply roll.

To normally maintain a substantially uniform, low tension on the strip material drawn from the supply rolls 12, 13, the unwind stand 10 is equipped with a pair of strip tension sensing and frictional feedback means 25 and 26, one for each of the turntables 17 and 18. Both of the feedback means 25 and 26 are identical and, with the exception of guide rollers 27 and 28 over which the strip material from the respective supply rolls 12 and 13 is trained, similar reference numerals will be used. Each feedback means includes an arm 30 secured to a shaft 31 journalled in bearings 32 (only one of which is shown) in the base plate 15 (see FIG. 3) and carries at one end a frictional drag shoe 33 for engaging the outer periphery of one of the turntables 17, 18. The drag shoe is preferably made of leather or other suitable friction material and is mounted on the arm 30 by a fastener 34 which permits lateral adjustment of the shoe relative to the arm. The rotatable shaft 31 on which the arm is mounted is relatively close to the end of the arm carrying the drag shoe so that substantial mechanical advantage is provided.

The guide rollers 27 and 28 are mounted on the other end of the arms 30 and function to sense the tension of the strip material drawn from the respective supply rolls 12 and 13 and to transmit this tension force to the long end of the arms 30. Means for biasing the arms 30 in opposition to the force applied to the arms by virtue of the tension of the strip is also provided by way of a weight 35 suspended on a cable 36 looped over an idler pulley 36a. The cables 36 are attached to the long ends of the arms 30 opposite the guide rolls 27 and 28.

During operation, the brake shoe 33 is pressed against the periphery of the operative turntable to a greater or lesser extent depending upon the strip tension. If the tension of the strip material increases, the arm 30 is pulled about its pivot 31 against the biasing force of the weight 35 to reduce the frictional drag force of the brake shoe 33. The force required to unwind the supply roll, and hence the tension of the strip material thereby decreases until equilibrium is again established. Conversely, if the strip tension decreases, the biasing force provided by the weight 35 tends to overcome the tension force and rotate the arm 30 so as to press the brake shoe 33 against the periphery with greater force thereby increasing strip tension. When the feedback means is in equilibrium, a slight amount of frictional drag is applied to the turntable and the tension and weight forces on the arm are equal and opposite.

Located between the turntables 17, 18 are a pair of independent guide rolls 37, 38 which, with a common guide roll 39 define a pair of closely spaced parallel paths for the strip material withdrawn from the respective supply rolls 12, 13. From the common guide roll 39 the strip material is fed into a variable length discharge loop defined by guide rolls 40, 41 and 42. Two of the guide rolls 40 and 42 are mounted on an extension 43 projecting from the base plate 15. The other guide element 41 is mounted on a slide block 44 reciprocally mounted on slide tracks 45 and 46 which extend between extension 43 and another extension 47.

The reciprocally movable element 41 is biased in a direction to normally maintain a substantial length to the discharge loop as the strip material is drawn therethrough. This biasing force is provided by a weight 48 suspended on a cable 49 connected to the slide block 44. The weight 48 is selected to maintain a biasing force greater than the normal strip tension but less than the tensile strength of the strip material.

Figure 1:
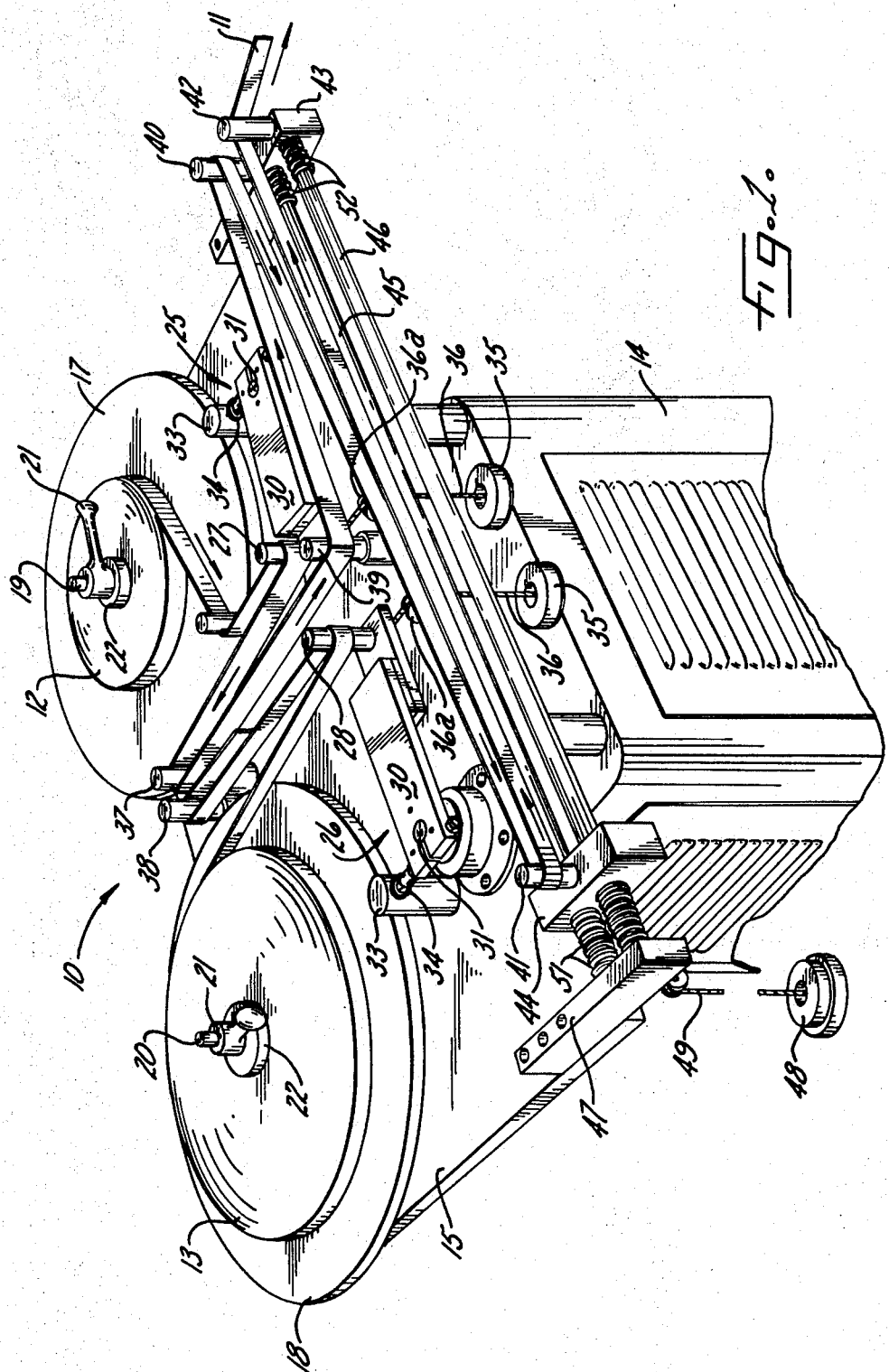
FIG. 1 is a partial perspective view of an unwind stand for continuously supplying strip material from successive supply rolls without interruption in accordance with the method of the present invention.
Figure 2:
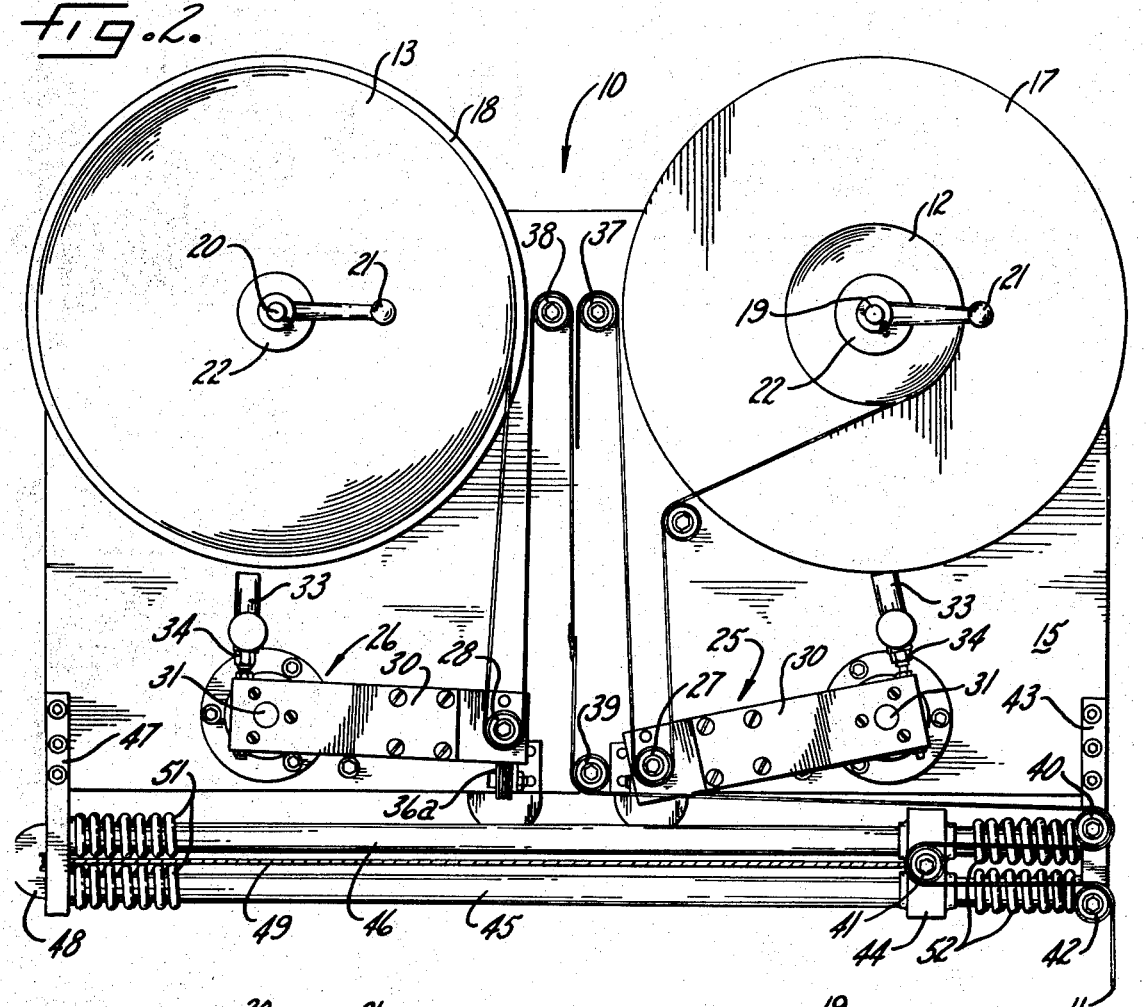
FIG. 2 is a plan view of the unwind stand shown in FIG. 1.

Thus, as shown in FIG. 2, the strip material from one of the supply rolls 12 may be momentarily stopped, severed and joined to the leading end of the strip material from the other supply roll 13. This may be conveniently done between guide elements 37, 38 and 39 which define the parallel paths leading to the variable length discharge loop. As the strip material from the active supply roll 12 is held, the bias provided by the weight 48 on the reciprocal guide element 41 is overcome and the length of the discharge loop progressively diminishes as additional strip material is withdrawn. Before the length of the discharge loop is entirely diminished the leading end of the strip material from the second supply roll 13 is spliced to the trailing end of the strip material from the initial supply roll 12 and the splice is released. This permits the weight 48 to draw the slide block 44 back to its original position (see FIG. 1) normally maintaining the substantial length of the discharge loop. In order to cushion the slide block 44 and prevent is from hitting either of the extensions 43, 47, a pair of buffer springs 51 and 52 are mounted on each end of the slide tracks 45 and 46.

While the invention has been described and illustrated herein in connection with certain preferred embodiments and procedures it is not intended to limit the invention to the specific embodiments shown or the procedures described. Rather it is intended to cover all alternative and equivalent methods and apparatus which fall within the spirit and scope of the appended claims.

I claim as my invention:

1. The method of continuously supplying strip material to a tube winding apparatus comprising the steps of:

drawing strip material from a first supply roll over elements which define a variable length discharge loop;

biasing one of said elements to normally maintain a substantial length to said loop as the strip material is drawn therefrom;

breaking the strip material between said first roll and said loop;

holding the trailing end of the strip material and overcoming the bias on said one element causing the length of said loop to progressively diminish as additional strip material is drawn therefrom;

splicing the leading end of strip material from a second supply roll to said trailing end; and, releasing said splice before the length of said loop is entirely diminished whereby said splice and the strip material from said second supply roll are drawn over said elements defining said loop and the output of strip material therefrom continues without interruption.

2. The method defined in claim 1 including the additional step of:

normally maintaining a substantially uniform tension on the strip material drawn from said first supply roll, said normal tension being just below that necessary to overcome said bias.

3. The method defined in claim 1 including the additional steps of:

initially guiding the strip material from said respective first and second supply rolls over independent guide means;

subsequently guiding the strip material from said first and second rolls over a common guide means; and, making said splice between said independent and common guide means.

4. The method defined in claim 1 including the additional steps of:

initially guiding the strip material from said respective first and second supply rolls over elements defining closely spaced parallel paths; and, making said splice by joining the strip material in said parallel paths.

5. The method defined in claim 2 including the additional step of:

normally maintaining a substantially uniform tension on the strip material drawn from said second supply roll.

6. An unwind stand for continuously supplying strip material under substantially constant tension comprising, in combination:

a base;

a pair of circular turntable assemblies each rotatably mounted on the base for supporting a roll of the strip material;

a drag element frictionally engageable with each of said turntable assemblies for maintaining the tension on the strip material drawn from the respective rolls substantially constant;

means including a reciprocally movable element defining a discharge loop of substantial length over which the strip material passes as it is drawn from either one of the rolls;

a plurality of guide elements defining closely spaced parallel paths for the strip material from the respective rolls to the discharge loop;

and means for applying a biasing force to said reciprocally movable element in a direction to normally maintain the substantial length of the loop as the strip material is drawn therethrough;

said biasing force being greater than the normal strip tension but less than the tensile strength thereof whereby the strip material from one of said rolls may be momentarily stopped, severed and joined to the end of the strip material from the other of said rolls between the elements defining said parallel paths as said reciprocally movable element moves in opposition to said biasing force allowing the discharge loop to diminish in length until said strip is released.

7. An unwind stand as defined in claim 6 wherein said reciprocally movable element is slidably mounted on a track and said biasing force is applied by a cable supported weight.

8. An unwind stand as defined in claim 7 including a buffer spring mounted on each end of said track for cushioning said movable element as it moves to either end of said track.

9. An unwind stand as defined in claim 1 wherein each of said drag elements is carried on an arm pivotally mounted on said base and said arm is biased toward said turntable by a cable supported weight.

10. An unwind stand as defined in claim 9 wherein each of said arms carries a guide roller around which the strip material is drawn, said roller being disposed with respect to the pivot of said arm such that increasing strip tension results in decreasing said drag force.

References Cited
UNITED STATES PATENTS

| | | | |
|---|---|---|---|
| 2,998,204 | 8/1961 | Walsh | 242—58.1 |
| 3,024,157 | 3/1962 | Beerli | 156—504 |
| 3,184,364 | 5/1965 | Butler et al. | 156—504 |
| 3,414,208 | 12/1968 | Butler et al. | 242—58.1 |

LEONARD D. CHRISTIAN, Primary Examiner

U.S. Cl. X.R.

156—504